United States Patent [19]

Smith

[11] 4,260,095

[45] Apr. 7, 1981

[54] METHOD OF MANUFACTURING A CLAD PRODUCT

[76] Inventor: Phillip H. Smith, 102 Haverford Rd., Pittsburgh, Pa. 15238

[21] Appl. No.: 934,967

[22] Filed: Aug. 18, 1978

[51] Int. Cl.³ ............................................. B23K 31/00
[52] U.S. Cl. ................................... 228/130; 228/129; 228/126; 228/173 D; 228/193
[58] Field of Search ............... 228/126, 130, 129, 193, 228/173 D, 243, 17, 265; 219/83, 82, 58, 56, 78.16, 121 LM

[56] References Cited

U.S. PATENT DOCUMENTS

| | | | |
|---|---|---|---|
| 3,054,176 | 9/1962 | Beneke | 228/130 |
| 3,355,796 | 12/1967 | Frieling, Jr. | 228/129 |
| 3,455,016 | 7/1969 | Dion et al. | 228/130 |
| 3,630,429 | 12/1971 | Matsuda et al. | 228/130 |
| 3,714,701 | 2/1973 | Dion et al. | 228/130 |
| 3,936,920 | 2/1976 | Conn, Jr. | 228/193 |
| 3,952,180 | 4/1976 | Gnanamuthu | 219/121 LM |
| 4,029,932 | 6/1977 | Cook | 219/121 LM |
| 4,059,876 | 11/1977 | Ditto | 219/121 LM |

FOREIGN PATENT DOCUMENTS 122897  5/1931  Austria ................................ 228/129

Primary Examiner—Daniel C. Crane

Attorney, Agent, or Firm—Finnegan, Henderson, Farabow, Garrett & Dunner

[57] ABSTRACT

A clad product having predetermined closely-toleranced shape and dimensions. The product is made by first preforming a base material and a cladding of dissimilar material in dimensions substantially the same as the clad product, with at least the base or cladding being preformed with an additional dimensional profile. At least the cladding material is then heated to a solid-phase bonding temperature, achieved in one embodiment by laser-heating. The base material and cladding material are subsequently passed together through pressure rollers with application of a pressure for solid-phase bonding the cladding material against the base material to form the clad product. The bonding pressure of the rollers deforms the preformed additional dimensional profile to compensate for non-uniform material flow in the respective base or cladding material during solid-phase bonding for obtaining the predetermined closely-toleranced shape and dimensions of the clad product. For making a circular rod clad product of closely-toleranced concentricity, at least the core or cladding material is shaped to compensate for deformation during subsequent pressure rolling. Where the core material is so shaped, it is formed in a transverse oval cross-section, and where the cladding material is so shaped, it is comprised of a plurality of transverse crowns formed on one or more cladding strips.

22 Claims, 19 Drawing Figures

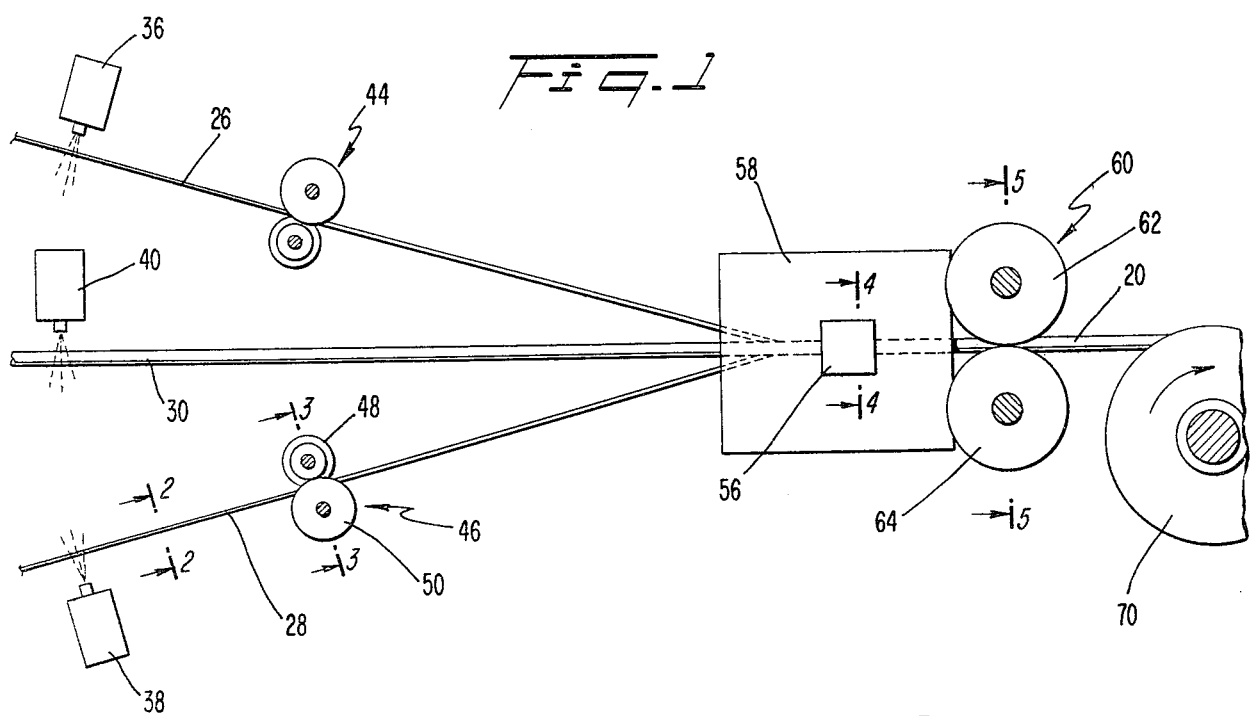
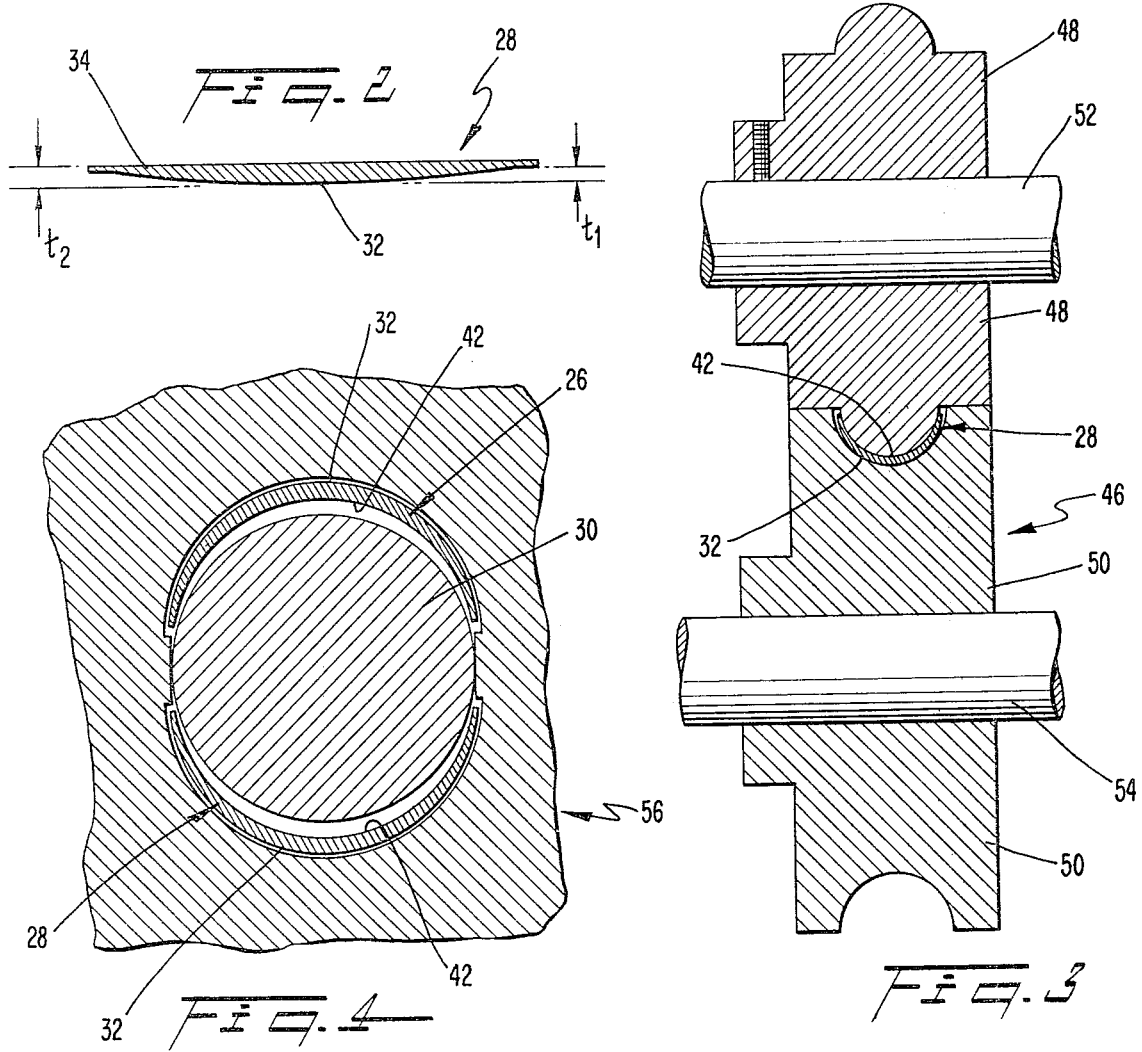

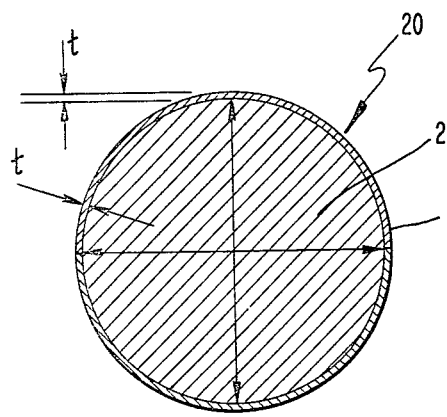
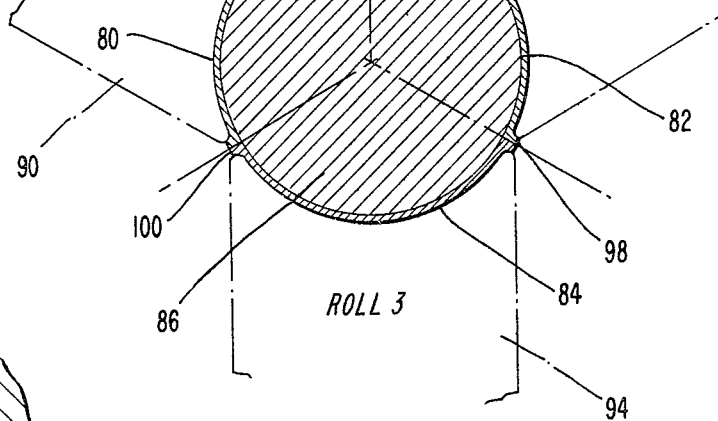
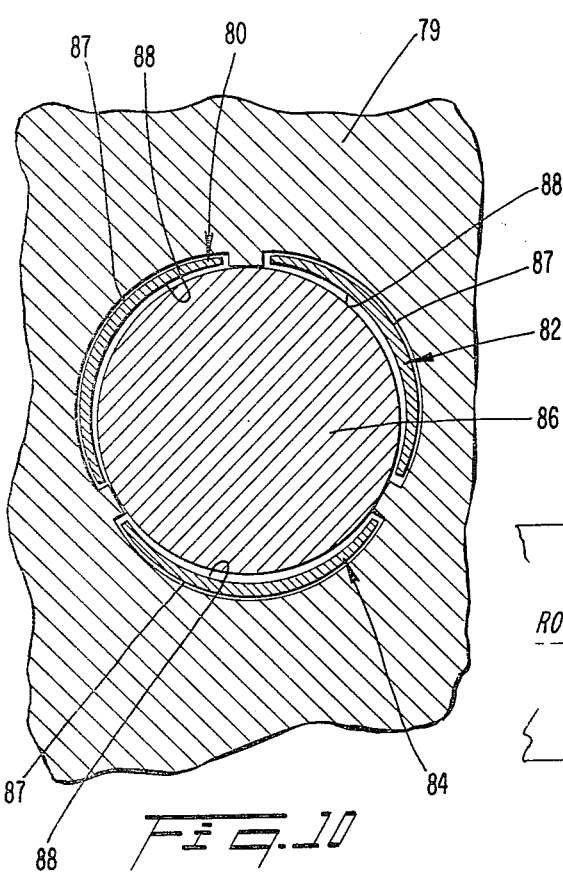
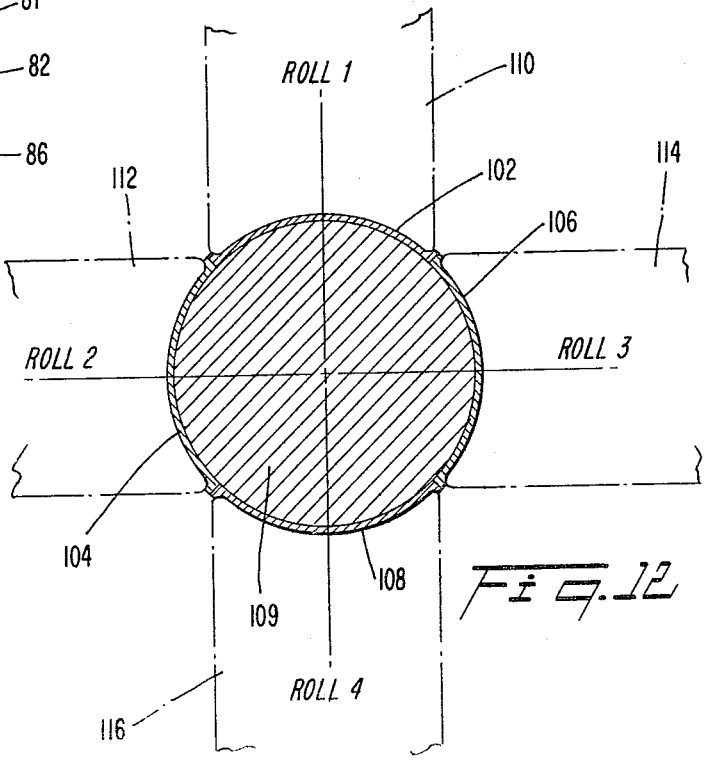

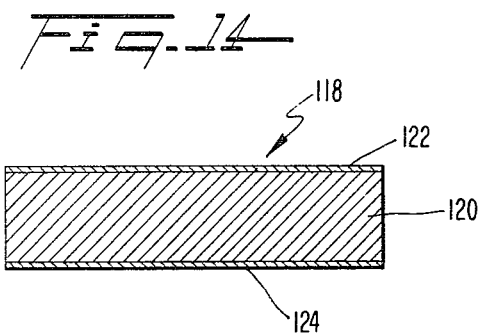
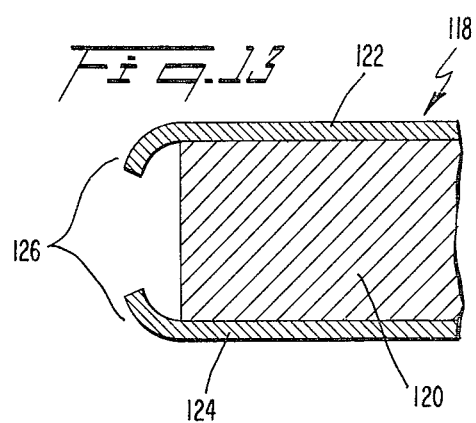
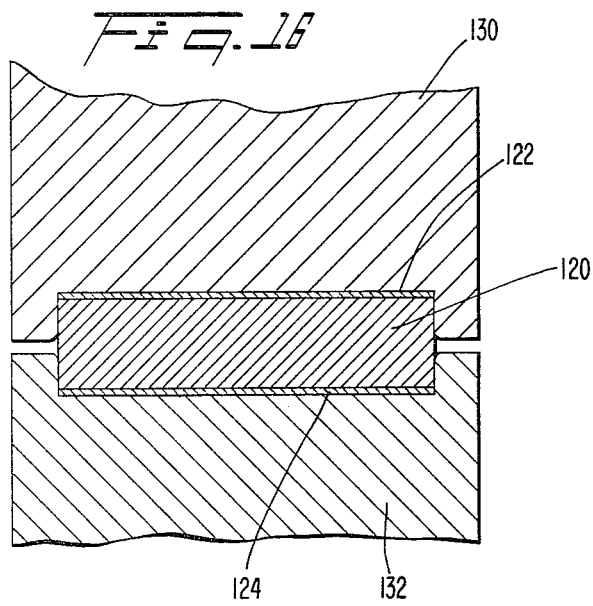
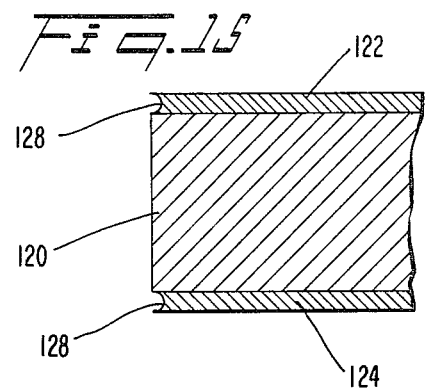
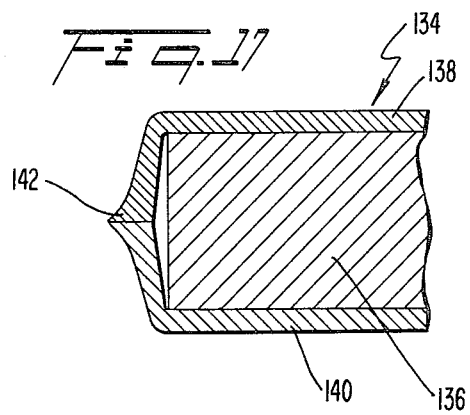
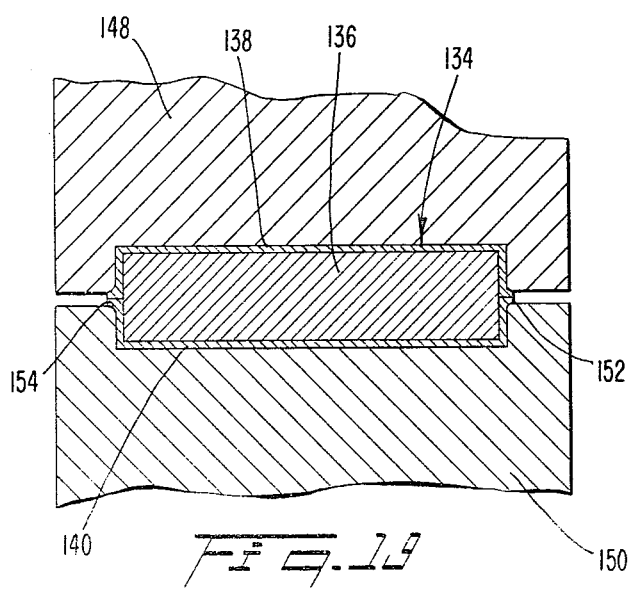
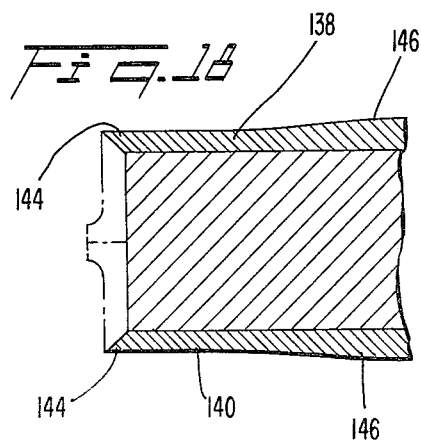

METHOD OF MANUFACTURING A CLAD PRODUCT

BACKGROUND OF THE INVENTION

This invention relates to a clad product formed of a base and a cladding of dissimilar materials, and the method of manufacture, and more particularly, to a clad product of predetermined closely-toleranced shape and dimensions manufactured by dimensionally pre-profiling at least the base or cladding material to compensate for dimensional distortion occurring during solid-phase bonding of the base and cladding together.

Clad products are commonly used where certain desired properties in a finished product are critical, but which cannot be obtained by that product being formed of just the base material. Therefore, there have been manufactured composite finished products formed, for example, of two dissimilar metals. The cladding technique of forming this type of composite product is to bond together the two dissimilar metals by suitable pressure and temperature so that at the interface each metal normally diffuses sufficiently into the other to produce a bond. The composite of a product having a substantially thin dissimilar metal cladding on the outer surface of a metal base is extremely suitable for obtaining different electrical or thermal conductivities, tensile or torsional strengths, corrosion resistance, wearability, and other desired physical and chemical product properties.

Wire-type clad products which comprise a circular metal rod core and an outer thin dissimilar metal sheath bonded around the rod core are of significant commercial and industrial importance. Examples of the wire-type clad product are telephone, electronic, and electrical coaxial cable for carrying a double signal. To obtain the electrical and other desirable properties for such cable, not only is the metal composition of the cable critical, but dimensional requirements, such as the concentricity of the clad product and thickness of the outer thin metal cladding sheath, must be held within very close tolerances.

All cladding products, e.g. wire and cable, must, of course, be manufactured in the most cost-effective way while ensuring the necessary composition and dimensional requirements. Two key factors in reducing cost are to provide a simple manufacturing method and to eliminate unnecessary material in the product itself or wastage occurring during manufacture. Product material waste becomes a substantial cost factor when it is necessary or desirable to make the outer cladding sheath of a precious or other expensive metal or material.

There have been developed generally three principal methods of forming clad products of two dissimilar metals, frequently referred to as (1) casting-and-rolling, (2) clad-casting, and (3) solid-cladding. In manufacturing a rod clad product by casting-and-rolling, the outer sheath is molten cast onto the base material in the form of a billet, the billet and outer cladding being subsequently rolled to form the composite product. The clad product produced by this process is, however, unsatisfactory by not having a perfect concentricity. An elliptical shape in the cross section of the product frequently occurs with non-uniform thickness in the outer clad sheath around the core due to pressure variation during rolling. This problem is further compounded by variation in the thicknesses of the outer clad sheath along the longitudinal direction of the rod clad product as a result of the tapering effect caused by the rolling process. That is, a thickness of the outer clad sheath is greatest at a position along that portion of the clad product which is formed in the middle of the billet with a thinner thickness being formed along those portions of the product formed at the ends of the billet. Finally, there is the problem of the rolling process squeezing off the outer cladding material at the billet ends, commonly referred to as self-cropping, thus resulting in a wastage in the cladding material during manufacture.

A rod clad product manufactured by clad-casting also proves unsatisfactory. Clad-casting involves feeding a cold-drawn or pre-formed circular core through a die into a receptacle where molten cladding material is then cast or coated around the core, the coated core than passing through an exit die with the composite rod clad product being taken up by a coiler for storage and subsequent wire drawing. With this method of manufacture, the outer clad sheath again has a non-uniform thickness and the concentricity of the end rod clad product is adversely affected. Several principal factors cause these unsatisfactory results. First, there is unevenness in the wear of the dies, at both the inlet and outlet, during casting of the molten cladding material. Secondly, there is a "guitar-string" effect caused by the rod core being fed under tension through the dies of the molten cladding material and into the coiler, causing a phenomenon of "chatter" or "shimmy" occurring in the casting of the molten cladding material around the core. This results in a cladding unevenness.

In an effort to overcome the problems encountered in the casting-and-rolling and clad-casting methods of manufacturing, solid-cladding has been developed.

One type of solid-cladding process is taught in U.S. Pat. No. 3,714,701 issued to Dion et al. This solid-cladding process forms a circular rod clad product by using a pair of continuous lengths of thin flat metal cladding strips, bending them into semi-circular shapes around a circular metal rod core, and then solid-phase bonding the cladding strips to the rod core. This solid-cladding process, however, again proves unsatisfactory to provide a circular rod clad product with a closely-toleranced concentricity and a uniform thickness in the outer cladding sheath. Product material waste also occurs in this process due to the non-uniformity of the sheath thickness.

The shortcomings encountered by using a solid-cladding process are caused by the key step of solid-bonding the two dissimilar materials. Solid-phase bonding requires that a sufficient pressure be exerted by rollers on the cladding strips for bonding the cladding strips against the circular core and for sealing the edge contacts of the cladding strips.

Because uniform circumferential pressure is not applied to all surfaces of a rod having a circular transverse shape during conventional rolling operations, concentrations of pressures result in different material flows in at least the cladding or core. These material flows can produce variations in thickness of the cladding layer. Thus, necessary pressure exerted by the rollers thins portions of the cladding strips so that a closely-toleranced concentricity of the end product and a uniform thickness for the cladding cannot be obtained. Furthermore, the varying circumferential pressures applied by the rollers can deform the core, thereby causing a non-concentric end product.

Frequently, a specification requires a minimum thickness for the outer cladding sheath, as well as uniformity. The thinning effect caused by solid-phase bonding would then require formation of an outer cladding sheath which has portions thicker than necessary in order to meet the overall minimum thickness standard. Excessive thickness in portions of the outer sheath, of course, creates wastage in the cladding material and a higher cost for the manufacture of the composite clad product.

In summary, the conventional clad products and their methods of manufacture have not proven completely satisfactory. Formation of a clad product having predetermined closely-toleranced shape and dimensions made in a cost-effective way has yet to be achieved. The severe limitations in the conventional methods of forming clad products are particularly prevalent in forming a circular rod clad product of closely-toleranced concentricity with uniform thickness for the outer cladding sheath. Difficulties attributed to the conventional methods of manufacture have been compounded recently by the significant increase in cost of the cladding and core materials and in the imposition of close dimensional tolerances and surface finish specifications for clad products now being developed for different commercial and industrial uses.

SUMMARY OF THE INVENTION

Accordingly, it is a primary object of this invention to eliminate the above-described problems in clad products and the methods of manufacturing clad products.

Another object of this invention is to obtain the predetermined closely-toleranced shape and dimensions of a clad product, particularly the closely-toleranced concentricity of a circular rod clad product.

Yet another object of this invention is to eliminate wastage of cladding and core materials during manufacture of a clad product and in the clad product itself.

Still another object of this invention is to provide a simple and expedient method of manufacturing clad products having the above-described predetermined closely-toleranced shape and dimensions.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects and in accordance with the purpose of the invention, as embodied and broadly described herein, the clad product comprises a base and a cladding of dissimilar materials and has a predetermined closely-toleranced shape and dimensions, the clad product being prepared by the steps of: (a) preforming a base material and a cladding of dissimilar material in dimensions substantially the same as the predetermined dimensions of the clad product with at least the base or cladding material being preformed with an additional dimensional profile for compensating for dimensional distortion occurring from non-uniform material flow in the respective base or cladding material during solid-phase bonding; (b) heating at least the cladding material to a solid-phase bonding temperature; and (c) passing the base material and cladding material together through pressure rollers with application of a pressure for solid-phase bonding the cladding material against the base material to form the clad product, wherein the bonding pressure deforms the preformed profile to compensate for dimensional distortion occurring from non-uniform material flow in the respective base or the cladding material during solid-phase bonding for obtaining the predetermined closely-toleranced shape and dimensions of the clad product.

In one preferred method of manufacturing a clad product, heating at least the cladding material to a solid-phase bonding temperature is achieved by induction heating.

In yet another preferred method of manufacturing the clad product, heating at least the cladding material to a solid-phase bonding temperature is achieved by laser heating.

In still another preferred method of manufacturing the clad product, both the base material and cladding material are heated to a solid-phase bonding temperature.

In one preferred embodiment of the invention, a circular rod clad product of closely-toleranced concentricity is made by the steps of: (a) preforming a core material and a cladding of dissimilar material with at least the core or cladding material being shaped to compensate for deformation during pressure rolling, and where the core material is so shaped, it is formed in a transverse oval cross-section, and where the cladding material is so shaped, it is comprised of a plurality of transverse crowns formed on one or more cladding strips; (b) heating at least the one or more cladding strips to a solid-phase bonding temperature; and (c) passing the core and the one or more cladding strips together through pressure rollers with application of a pressure for solid-phase bonding the one or more cladding strips against the core to form the circular rod clad product, wherein the bonding pressure deforms the at least oval core or cladding strip transverse crowns to compensate for dimensional distortion occurring from non-uniform material flow in the respective core or one or more cladding strips during solid-phase bonding for obtaining the closely-toleranced concentricity of the circular rod clad product.

In one preferred method of manufacturing the circular rod clad product of closely-toleranced concentricity, the core is preformed in a circular cross-section and a plurality of transverse crowns are preformed on one or more cladding strips, and wherein the core and the one or more cladding strips are passed together through pressure rollers for solid-phase bonding the one or more strips against the core, the bonding pressure deforming the cladding strip transverse crowns for obtaining a rod clad product of closely-toleranced concentricity with an outer cladding sheath of uniform thickness around the circular core.

In the above described method of manufacturing the circular rod clad product, there are formed a plurality of cladding strips, each strip having a transversely crowned surface. The plurality of cladding strips comprise in one embodiment two strips, in a second embodiment three strips, and in a third embodiment four strips. The core is positioned between either the two, three, or four cladding strips with the transversely crowned surfaces facing away from the core. The core and strips are then passed together through either two, three, or four corresponding rotating pressure rollers for solid-phase bonding the strips against the core, the bonding pressure of the rollers deforming the crowned strips to circular form for obtaining the rod clad product of closely-toleranced concentricity with an integral outer clad sheath of uniform thickness around the circular core.

In another preferred method of manufacturing the circular rod clad product of closely-toleranced concentricity, not only are the plurality of transverse crowns formed on one or more cladding strips, but also the core is preformed in a transverse oval cross section, and wherein the oval core and the one or more cladding strips are passed together through the pressure rollers for solid-phase bonding the one or more strips against the core, the bonding pressure deforming the cladding strip crowns and the oval core rod for obtaining the rod clad product of closely-toleranced concentricity with an outer cladding sheath of uniform thickness around the circular core.

In still a further preferred method of manufacturing the circular rod clad product of closely-toleranced concentricity, the core is preformed in a transverse oval cross section, and one or more cladding strips are preformed, each having uncrowned flat surfaces and wherein the oval core and the one or more cladding strips are passed together through the pressure rollers for solid-phase bonding the one or more strips against the core, the bonding pressure deforming the oval core to circular form for obtaining a rod clad product of closely-toleranced concentricity with an integral outer cladding sheath of uniform thickness around the circular core.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a schematic diagram of a preferred method of and apparatus for manufacturing a circular rod clad product in accordance with this invention;

FIG. 2 is a cross-sectional view, taken along line 2—2 of FIG. 1, of one embodiment of a cladding strip having a crowned surface for use in the method of FIG. 1 to manufacture a circular rod clad product;

FIG. 3 is a side and cross-sectional view, taken along line 3—3 of FIG. 1, of the bending by rollers of the crowned cladding strip of FIG. 2 for use in the method of FIG. 1;

FIG. 4 is an exploded cross-sectional view, taken along line 4—4 of FIG. 1, showing the positioning of a pair of crowned cladding strips around a circular core for subsequent solid-phase bonding in the method of FIG. 1;

FIG. 9 is a cross-sectional view of a circular rod clad product of closely-toleranced concentricity with an outer clad sheath of uniform thickness manufactured in accordance with the method of FIG. 1;

FIG. 10 is an exploded cross-sectional view showing the positioning of three crowned cladding strips around a circular core for solid-phase bonding in a preferred method of manufacturing a circular rod clad product in accordance with this invention;

FIG. 11 is a cross-sectional view showing the solid-phase bonding of the three crowned cladding strips and the circular core of FIG. 10 together by using three equally-spaced pressure rollers to form the circular rod clad product;

FIG. 12 is a cross-sectional view showing the solid-phase bonding of four crowned cladding strips to a circular core by using four equally-spaced pressure rollers in a preferred method of manufacturing a circular rod clad product in accordance with this invention;

FIG. 13 is a fragmented cross-sectional view of a clad product having two flat cladding strips solid-phase bonded on opposing sides of a rectangular-shaped base formed by a conventional method;

FIG. 14 is a cross-sectional view of a clad product having two flat cladding strips solid-phase bonded on opposing sides of a rectangular-shaped base formed in accordance with this invention;

FIG. 15 is a fragmented cross-sectional view showing the positioning of two cladding strips preformed with an additional dimensional profile at the ends thereof around a rectangular-shaped base for subsequent solid-phase bonding to form the clad product of FIG. 14;

FIG. 16 is a cross-sectional view showing the solid-phase bonding of the two cladding strips on opposing sides of the base of FIG. 15 by using a pair of pressure rollers for manufacturing the clad product of FIG. 14;

FIG. 17 is a fragmented cross-sectional view of a clad product having flat cladding strips solid-phase bonded on all sides of a rectangular-shaped base formed by a conventional method;

FIG. 18 is a fragmented cross-sectional view showing the positioning of two cladding strips preformed with an additional dimensional profile around a preformed rectangular-shaped clad product having cladding on all base sides in accordance with this invention; and FIG. 19 is a fragmented cross-sectional view showing the solid-phase bonding of the two cladding strips on all sides of the base of FIG. 18 by using a pair of pressure rollers for manufacturing the rectangular-shaped clad product in accordance with this invention.

DETAILED DESCRIPTION OF THE PREFERRED EMBODIMENTS

Figure 5:
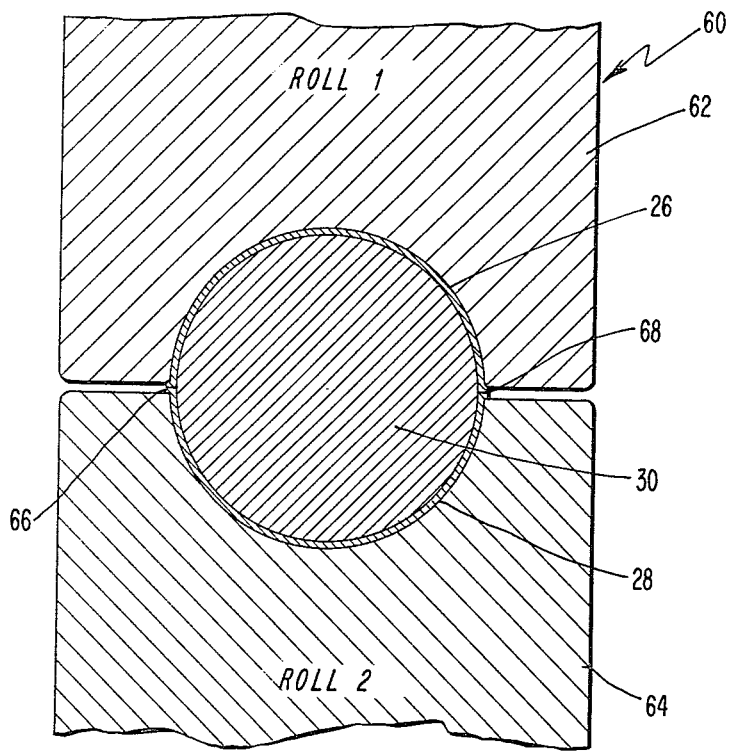
FIG. 5 is an exploded fragmented cross-sectional view, taken along line 5—5 of FIG. 1, showing the solid-phase bonding of the pair of crowned cladding strips of FIG. 4 against the circular core by using a pair of pressure rollers in the method of FIG. 1.

Reference will now be made in detail to the present preferred embodiments of the invention, examples of which are illustrated in the accompanying drawings.

In accordance with the invention, a clad product having predetermined closely-toleranced shape and dimensions is made by (1) preforming a base material and a cladding of dissimilar material in dimensions substantially the same as the predetermined dimensions of the clad product with at least the base or cladding material being preformed with an additional dimensional profile for compensating for dimensional distortion occurring from non-uniform material flow in the respective base or cladding material during solid-phase bonding, (2) heating at least the cladding material to a solid-phase bonding temperature, and (3) passing the base material and cladding material together through pressure rollers with application of a pressure for solid-phase bonding the cladding material against the base material to form the clad product. Because of the shapes of the base and cladding and the pressure rollers, a non-uniform pressure is applied across the cladding material. This non-uniform pressure results in differential flow in at least the base or cladding material producing variations in the shape of the product. However, with the preformed profile, the bonding pressure so deforms the preformed profile to compensate for dimensional distortion occurring from the non-uniform material flow in the respective base or cladding material during solid-phase bonding, providing the predetermined closely-toleranced shape and dimensions of the desired clad product.

Referring now to FIG. 9, there is shown a cross-sectional view of a circular rod clad product of closely-toleranced concentricity, numbered generally 20, made in accordance with the teachings of the invention. The composite rod clad product comprises a core 22 of perfect circularity formed of a base material and an outer substantially thin cladding sheath 24 of a uniform thickness "t" formed of a dissimilar material and extending around core 22. While core 22 of the rod clad product is depicted in FIG. 9 as a solid core, the rod clad product 20 can comprise a core 22 formed in a tubular shape, or having an inner hollow section.

To make circular rod clad product 20 of closely-toleranced concentricity, the method of manufacturing includes first preforming a core material and a cladding of dissimilar material, with at least the core or cladding being shaped to compensate for deformation during pressure rolling. Where the core material is so shaped, it is formed in a transverse oval cross section, and where the cladding is so shaped, it is comprised of a plurality of transverse crowns formed on one or more cladding strips.

Referring now to FIG. 1, there is shown a schematic diagram of a first preferred method of and apparatus for manufacturing circular rod clad product 20. As here embodied, there is preformed a circular core 30 of one material and a pair of cladding strips 26 and 28 of dissimilar material. In the most common applications, the core and cladding are formed of dissimilar metals. There are applications, however, where one of the product components is metal and the other component is a non-metal.

As illustrated in FIG. 2 in a cross-sectional view of cladding strip 28, each of the cladding strips 26 and 28 has a transversely-crowned surface 32. The crowned surface 32 has a thickness "$t_1$" above the substantially thin flat portion of the cladding strip to form an overall thickness "$t_2$". It is preferred that an uncrowned flat surface 34 be preformed opposite to the crowned surface 32.

As here embodied, at least the cladding strips 26 and 28, after being preformed in the manner described above, are heated to a solid-phase bonding temperature. It is preferable, however, to also heat the circular core 30 to ensure a proper subsequent bonding of the cladding strips against the core. The cladding strips 26 and 28 and the circular core rod 30 are shown in FIG. 1 as being heated by respective heating means 36, 38, and 40.

Heating means 36, 38, and 40 can comprise resistance-heaters having resistance-shoes riding on the cladding strips 26 and 28 and core 30. Resistance-heaters are generally used when the cladding strips and core comprise metal with electricity being applied from a circuit to establish current flow through the metals of the core rod and cladding strips. Since the core and strips have a resistance substantially higher than the electrical circuit, it causes them to become hot and thus heated. Resistance-heaters for the heating step of clad product manufacture have several significant drawbacks, however. The cladding strips and core have to be electrically conductive and the inherent resistance of metals, for example, to be used in the clad product is a controlling factor. Application is thus severely limited. Since it is preferred to heat both the core and cladding strips, there are in most applications two different metals involved, with corresponding differences in current flow. This phenomenon of uneven current flows results in arcing and pitting of interfacial surfaces between the cladding strips and core as well as in the manufacturing equipment. Manufacturing equipment may thus become damaged and the finished clad product unsatisfactory.

To overcome the problems of resistance-heating, it is preferred in a second embodiment to heat the cladding strips and core for manufacturing a clad product by induction heating. Therefore, the heating means 36, 38, and 40 would comprise induction heating devices surrounding the core 30 and cladding strips 26 and 28. Induction heating eliminates the arcing and pitting and prevents damage to the manufacturing equipment found to occur in resistance heating. There are limitations to induction heating however. The cladding strips and core to be heated have to be formed of materials or metals electrically excitable. Induction heating is also a slow heating process so that it may become the controlling process step in limiting the overall speed of manufacturing the clad product.

In view of the shortcomings of both resistance and induction heating, it is preferred in a third embodiment to heat the cladding strips and core for manufacturing a clad product by laser heating. Heating means 36, 38, and 40, therefore, would comprise laser heating devices. Laser heating has significant advantages in clad product manufacture. First, damage to manufacturing equipment and the finished clad product from arcing and pitting is eliminated. Secondly, there is no heating limitation due to the types of materials used for the cladding strips and the core. The optimum laser heating device can be preselected for each of the materials of the cladding strips and the core to be used in the manufacture of the clad product. This makes the manufacturing operation significantly more versatile. Thirdly, the speed of overall manufacturing of the clad product can be improved because laser heating is a relatively fast heating technique. Finally, laser heating will provide a more precise and localized heating of the cladding strips and the core leading to fewer process problems, particularly in the exposure of these members to the atmosphere during and after heating, and prior to solid-phase bonding. This provides a better quality finished clad product.

In the preferred method of manufacture shown in FIG. 1, each of the cladding strips 26 and 28 is contoured to a concave surface 42 opposite to the crowned surface 32. The cladding strips 26 and 28, having a cross section as shown in FIG. 2, are preferably contoured by respective roller means 44 and 46 subsequent to the heating step previously described. As illustrated by the cross-sectional view of roller means 46 shown in FIG. 3, each of roller means 44 and 46 comprises a convex roller 48 and an opposing concave roller 50 turning on respective axles 52 and 54. Each of the cladding strips, such as strip 28 depicted in FIG. 3, is fed between the opposing convex and concave rollers 48 and 50 to form concave surface 42 opposite to the crowned surface 32 in a semicircular shape.

As embodied in the method of FIG. 1, circular core 30 in the next step is positioned between the pair of cladding strips 26 and 28 prior to solid-phase-bonding. As best shown in FIG. 4, cladding strips 26 and 28 have their transversely crowned surfaces 32 facing away from circular core 30 with their concave surfaces 42 positioned around the circular core 30 by positioning means 56. For positioning a pair of cladding strips 26 and 28 having concave surfaces 42 opposite to crowned surfaces 32, positioning means 56 takes the form of a guide box having an elliptical-shaped interior for bringing the contoured crowned strips 26 and 28 around core 30. It can be seen, however, that when a pair of cladding strips 26 and 28 are to be positioned around the core 30 which are not pre-contoured, i.e., uncrowned flat surfaces 34 opposite the crowned surfaces 32 such as shown in FIG. 2, positioning means 56 may be appropriately modified to accommodate this configuration of the strips. Whether the cladding strips are pre-contoured or can be positioned around the core without pre-contouring for subsequent bonding depends, of course, upon factors such as the materials of the cladding and core.

As best shown in FIG. 1, means 58 is provided for enclosing the cladding strips 26 and 28 positioned around circular core 30. This enclosure means 58 is used to maintain the solid-phase bonding temperature and to avoid contamination and inhibit atmospheric reaction of the cladding strips 26 and 28 and circular core 30 simply by preventing entry of air to reduce possible oxidation and heat loss. Enclosure means 58, however, can also be used to enhance the subsequent step of bonding the cladding strips 26 and 28 and core 30 together. A gas, for example, could be maintained in the enclosure so that the bonding speed or reaction of the core and strip materials would be improved.

In the next manufacturing step for the method of FIG. 1, the circular core 30 and crowned cladding strips 26 and 28 are passed together through pressure roller means 60 with application of a pressure sufficient for solid-phase bonding the cladding strips 26 and 28 against the core to form the clad product. As best shown in FIG. 5, pressure roller means 60 preferably comprises two pressure rollers 62 and 64 having two opposing inner concave surfaces. Circular core 30 previously positioned between the pair of cladding strips 26 and 28 with crowned surfaces 32 facing away from core 30 and concave surfaces 34 contoured around the outer surface of core 30 are passed together through the opposing rotating pressure rollers 62 and 64.

The pressure of rollers 62 and 64 must be sufficient to solid-phase bond the two cladding strips 26 and 28 around the circular core 30 as well as to sealingly engage the facing edges of cladding strips 26 and 28 together at points 66 and 68. The rollers 62 and 64 apply a non-uniform pressure across the cladding strips 26 and 28, thus producing differential material flow in the cladding. Variations in the shape and dimensions of the product result, normally non-concentricity of the circular rod clad product and non-uniformity in the thickness of the outer cladding sheath. However, because of the preformed profiles, such as the crowned surfaces 32 provided on the cladding strips 26 and 28, the pressure exerted by rollers 62 and 64 so deforms crowned portions 32 to compensate for dimensional and shape distortion that normally would have occurred.

In this preferred embodiment, the circular core 30 is depicted as being solid and would be made of a material so as not to deform under the predetermined bonding pressure. If the circular core 30 is formed in a tubular shape, it would be formed with sufficient strength to withstand any deformation from the bonding pressure. Consequently, a circular rod clad product 20 formed of closely-toleranced concentricity having an integral outer cladding sheath 24 of uniform thickness "t" formed around a circular core 22 is achieved in accordance with the teachings of this invention. As illustrated in FIG. 1, after leaving pressure roller means 60, the circular rod clad product 20 may be taken up by a reel 70 for temporary storage. Prior to this take up, however, any flashings, such as at points 66 and 68, can be cut off from the product by conventional apparatus.

Figure 7:
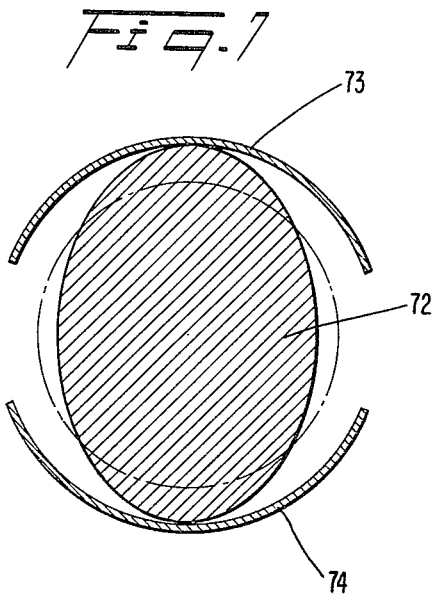
FIG. 7 is a cross-sectional view of one embodiment of a core having an oval cross section shown in position for solid-phase bonding with a pair of uncrowned cladding strips for use in the method of FIG. 1 to manufacture the circular clad product.

In the method of manufacturing a circular rod clad product shown in FIG. 1, the differential pressures applied by roller means 60 can deform the core, depending upon the solid-bonding pressure required and materials used in the product 20. That is, if the core is formed of a material lacking sufficient strength under the required bonding pressure, the core would deform out of round during the process. Therefore, another preferred embodiment comprises preforming a core 72, as best seen in FIG. 7, with an oval transverse cross-section. If the cladding strips to be used are formed of a material that will deform under the required bonding pressure, the cladding strips would again be preformed as a pair of strips 26 and 28 with crowned surfaces 32.

If, however, the cladding strips to be used are formed of a material of sufficient strength or rigidity that will not result in a differential material flow under the required bonding pressure, they will be preformed, as shown in FIG. 7, as claddings 73 and 74 with flat uncrowned surfaces. The remaining steps of manufacture are similar to those described previously. For example, both cladding strips 73 and 74 and oval core 72 are previously heated to the solid-phase bonding temperature by heating means 36, 38, and 40. Heating in one embodiment is by resistance heating, in a second embodiment by induction heating, and a third embodiment by laser heating. Cladding strips 73 and 74 can again be pre-contoured by roller means 44 and 46 shown in FIGS. 1 and 3.

As here embodied, the next manufacturing step is to position oval core 72 between the pair of uncrowned cladding strips 73 and 74 for subsequent solid-phase bonding. As schematically shown in FIG. 7, the pair of uncrowned cladding strips 73 and 74 having contoured concave surfaces are positioned around the core 72 by positioning means similar to that depicted in FIG. 4. Positioning means 56, for example, could be modified to accept the shape of the oval core rod 72 and cladding strips 73 and 74.

Figure 8:
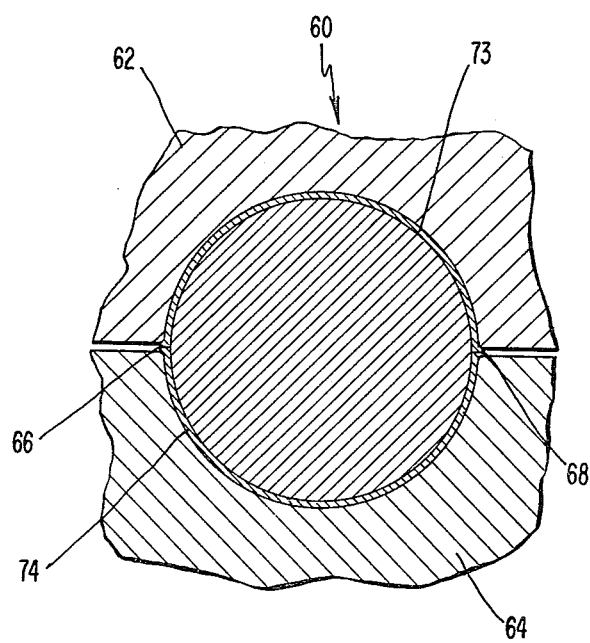
FIG. 8 is an exploded fragmented cross-sectional view showing the solid-phase bonding of the uncrowned cladding strips and oval core of FIG. 7 together by using a pair of pressure rollers in the method of FIG. 1.

After positioning, and as best shown in FIG. 8, oval core 72 and cladding strips 73 and 74 are passed together through pressure means 60 with application of a pressure sufficient for solid-phase bonding the cladding strips 73 and 74 against the core 72 to form the clad product. Pressure roller means 60 preferably comprises the two pressure rollers 62 and 64 previously discussed.

When the full bonding pressure is applied by rollers 62 and 64 against the cladding strips 73 and 74 and oval core 72, the differential material flows occurring in the core would normally produce a non-concentric rod clad product. However, because of the performed profile of the oval core 72, the roller pressure so deforms the oval core 72 to compensate for the dimensional and shape distortion that would have occurred. Consequently, the circular rod clad product 20 shown in FIG. 9 is formed of closely-toleranced concentricity having an integral outer cladding sheath 24 of uniform thickness "t" formed around a circular core 22 in accordance with the teachings of this invention.

In another preferred method of manufacturing a circular rod product 20 having the closely-toleranced concentricity shown in FIG. 9, there is preformed a plurality of transverse crowns on a single cladding strip. A core is also performed which would comprise a circular core, such as core 30 shown in FIG. 4, or an oval core, such as core 72 shown in FIG. 7, depending upon the solid-bonding pressure required and the material used in the core.

Figure 6:
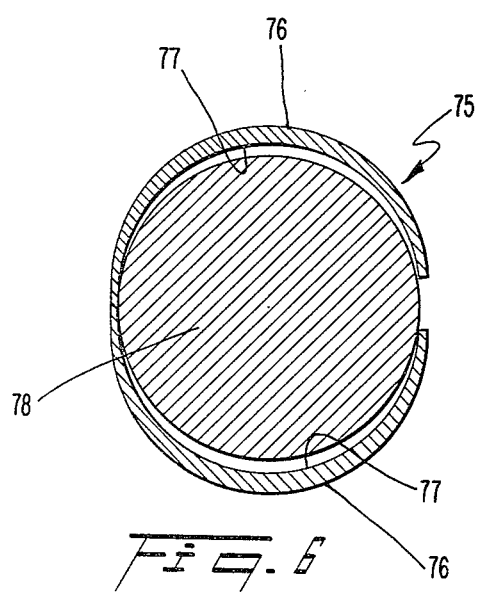
FIG. 6 is a cross-sectional view, showing a pair of transverse crowns formed on a single cladding strip contoured around a circular core in position for solid-phase bonding in a preferred method of manufacturing a circular rod clad product in accordance with this invention.

As shown in FIG. 6, there is embodied a single cladding strip 75 having an outer surface with a pair of crowns 76 formed thereon and an inner concave surface 77 contoured around the outer surface of a circular core 78 in position for subsequent solid-phase bonding. The strip 75 would be preformed, and then contoured and positioned around core 78 by appropriate roller means so that crowns 76 oppose each other.

The strip 75 and core 78 are passed together pressure roller means, such as shown in FIG. 5. When a pressure is applied sufficient for solid-phase bonding strip 75 against core 78, the crowns 76 are deformed to compensate for the dimensional and shape distortion that would have occurred from differential material flow in the cladding. The circular rod clad product 20 shown in FIG. 9 is, therefore, again formed in accordance with the teachings of this invention.

In another preferred method of manufacturing a circular rod clad product 20 having the closely-toleranced concentricity shown in FIG. 9, there is preformed three cladding strips, each with a transversely crowned surface, and a circular core. Similar to the method of FIG. 1, each of the three cladding strips may in one embodiment have an uncrowned flat surface opposite to the crowned surface for pressing engagement against the core and in another embodiment a concave surface opposite to the crowned surface for pressing engagement against the core.

The manufacturing steps preformed on the three cladding strips and core are analogous to the steps described for the method depicted in FIG. 1. As here embodied, positioning means 79, shown in FIG. 10, in a manner similar to positioning means 56 used in the method of FIG. 1, positions three cladding strips 80, 82, and 84 around circular core 86 with crowned surfaces 87 facing away from circular core 86 and concave surfaces 88 of the cladding strips contoured around the outer surface of the circular core 86 for subsequent solid-phase bonding.

As shown in FIG. 11 and as here embodied, the three cladding strips 80, 82, and 84 and core 86 are passed together through pressure roller means comprising three equally-spaced pressure rollers 90, 92, and 94. A bonding pressure is applied sufficient to solid-phase bond the cladding strips 80, 82, and 84 around the circular core 86 and to sealingly engage the facing edges of cladding strips 80, 82, and 84 at points 96, 98, and 100.

The three rollers 90, 92, and 94 produce a non-uniform circumferential pressure and thus a differential material flow occurring in the cladding strips 80, 82, and 84. The rollers, however, will also deform the crowned portions 87 of the three cladding strips during this material flow. The rod clad product 20 of closely-toleranced concentricity is, therefore, again formed with an integral outer cladding sheath 24 of uniform thickness "t" around a circular core 22 in accordance with the teachings of this invention. The solid-phase bonding of three cladding strips around a core in the manner described has a significant advantage because there is obtained a more perfect concentricity in the circular rod clad product 20 and a more uniform thickness in the outer sheath 24.

A further preferred method of manufacturing a circular rod clad product for enhancing the closely-toleranced concentricity and uniform thickness of the outer sheath comprises performing four cladding strips, each with a transversely crowned surface, and a circular core. The steps of manufacture would again be analogous to the method depicted in FIG. 1. As shown in FIG. 12, the four cladding strips, numbered 102, 104, 106, and 108, are positioned around a circular core 109 and then passed together through four equally-spaced pressure rollers 110, 112, 114, and 116. The non-uniform bonding pressure of rollers 110, 112, 114, and 116, while causing a differential material flow across the cladding strips 102, 104, 106, and 108, simultaneously deforms the crowned portions of the cladding strips. Consequently a circular rod clad product 20 is formed again of perfect concentricity with an integral outer cladding sheath 24 of uniform thickness "t" around a circular core 22.

It can be seen that the thickness of the transverse crown on the one or more cladding strips corresponds to the amount of deformation caused in the cladding by the solid-phase bonding pressure of the pressure rollers. Therefore, the crowns would be performed in accordance with that pressure, thus dependent upon the materials used for the clad product, the solid-phase bonding temperature, and the number of cladding strips and pressure rollers. A core with an oval cross-section in combination with crowned or uncrowned cladding strips described previously for certain preferred embodiments would also be preformed in accordance with these parameters.

In the above-described embodiments of the invention, there have been shown preferred methods of manufacturing a circular rod clad product of closely-toleranced concentricity. As noted earlier, however, a clad product having any predetermined closely-toleranced shape and dimensions may be made by the method of manufacture in accordance with this invention, by comprising the steps of: (1) performing a base material and a cladding of dissimilar material in dimensions substantially the same as the predetermined dimensions of the clad product, with at least the base or cladding material being performed with an additional dimensional profile for compensating for dimension distortion occurring from non-uniform material flow in the respective base or cladding material during solid-phase bonding; (2) heating at least the cladding material to a solid-phase bonding temperature; and (3) passing the base material and cladding material together through pressure rollers with application of a pressure for solid-phase bonding the cladding material against the base material to form the clad product. The bonding pressure deforms the preformed profile to compensate for the dimensional distortion occurring from differential or non-uniform material flow in the respective base or cladding material during solid-phase bonding for obtaining the predetermined closely-toleranced shape and dimensions of the finished clad product.

Referring now to FIGS. 13-16, there is shown a clad product 118 having a rectangular-shaped base 120 of one material and flat cladding strips 122 and 124 of a dissimilar material solid-phase bonded on two opposing sides of base 120. FIG. 13 illustrates a finished clad product made by conventional techniques wherein cladding strips 122 and 124 have dimensional distortion occurring from material flow during solid-phase bonding over the edges of the base at points 126. The clad product, therefore, does not satisfy the closely-toleranced shape and dimensional requirements and the excessive material at points 126 must be trimmed, thus resulting in cladding material wastage.

A finished clad product 118 made in accordance with this invention, and as embodied in FIG. 14, has flat cladding strips 122 and 124 solid-phase bonded on base 120 without any excessive material overlapping the edges of the base. To obtain this clad product, and as shown in FIG. 15, cladding strips 122 and 124 are preformed with an additional dimensional profile, such as at point 128. Thus, when cladding strips 122 and 124 and base 120 are passed together through pressure rollers with application of sufficient pressure for solid-phase bonding the cladding strips against the base, the bonding pressure deforms the preformed profile to compensate for the differential material flow occurring in the cladding material. The solid-phase bonding of cladding strips 122 and 124 against base 120 by a pair of pressure rollers 130 and 132 is illustrated in FIG. 16. It can be seen that other dimensional profiles can be preformed on cladding strips 122 and 124, such as a crown or a concave surface, depending upon the width and other dimensions of the rectangular-shaped clad product. This manufacture thus results in the clad product 118 shown in FIG. 14 of closely-toleranced rectangular shape and dimensions without excessive material or wastage.

Referring now to FIGS. 17-19, there is shown a clad product 134 having a rectangular-shaped base 136 of one material and flat cladding strips 138 and 140 of a dissimilar material solid-phase bonded on the four sides of base 136. FIG. 17 illustrates a finished clad product made by conventional techniques wherein the cladding strips 138 and 140 have a non-uniform thickness occurring at the side edges at 142.

To overcome the above problem in the conventional techniques, a finished clad product 134 made in accordance with this invention comprises preforming, as best shown in FIG. 18, a pair of cladding strips 138 and 140 with an additional dimensional profile, such at points 144 and 146, for compensating for the differential or non-uniform material flow occurring during solid-phase bonding. The base 136 and profiled cladding strips 138 and 140 are passed together through a pair of pressure rollers 148 and 150 as illustrated in FIG. 19, with application of a sufficient pressure for solid-phase bonding the cladding strips against the base and around the sides of the base to form the clad product. The dimensional profiles at 144 and 146 will enhance the material flow occurring during solid-phase bonding and permit sealing of the facing edges of cladding strips 138 and 140 at 152 and 154. This manufacture thus results in a clad product of closely-toleranced rectangular shape and dimensions.

It will be apparent to those skilled in the art that modifications and variations could be made in the clad product prepared in accordance with the teachings of this invention without departing from the spirit or scope of the invention. It can be seen that the method of manufacture in accordance with the teachings of this invention can be applied to a clad product having any type of shape and dimension, particularly where the shape is closely-toleranced and the dimensional requirements are critical. It can also be seen that the range of materials for the base and the cladding are wide. Examples of base metals include, but are not limited to, aluminum, copper, steel, nickel and related alloys. Examples of cladding metals include, but are not limited to, copper, silver, platinum, and other like alloys and precious metals. As previously described, there are embodiments in which the base and cladding materials are non-metals. The cladding material, for example, could comprise a non-metal, such as thermoplastic, to provide a corrosion resistant sheath around a base metal. Thus, it is intended that the present invention cover the modifications and variations of this invention within the scope of the appended claims and their equivalents.

What is claimed is:

1. A method of manufacturing a clad product of predetermined dimensions having a core member of uniform cross section and a cladding solid-phase bonded thereon comprised of a material dissimilar from that of the core member, the cladding being of uniform thickness and concentricity with respect to the core member, comprising the steps of:
    (a) preforming the core member and the cladding in dimensions substantially the same as the predetermined dimensions of the clad product, with at least the core member or the cladding being preformed with an additional dimensional profile for compensating for dimensional distortion occurring from non-uniform material flow in the respective core member or cladding during solid-phase bonding;
    (b) heating the core member and the cladding to a solid-phase bonding temperature; and
    (c) passing the core member and the cladding together through pressure rollers with application of a pressure for solid-phase bonding the cladding against the core member to form the clad product, wherein the bonding pressure deforms the preformed profile to compensate for the dimensional distortion occurring from non-uniform material flow in the respective core member or cladding during solid-phase bonding for obtaining the predetermined product dimensions and uniform thickness and concentricity of the cladding.

2. The method of claim 1, wherein the dimensions of the profile preformed in step (a) correspond to the amount of deformation caused by the bonding pressure during the solid-phase bonding of step (c).

3. A method of manufacturing a circular rod clad product of uniform concentricity having a core member and a cladding comprising one or more cladding strips solid-phase bonded thereon and comprised of a material dissimilar from that of the core, comprising the steps of:
    (a) performing the cladding with a plurality of transverse crowns formed on the one or more cladding strips to compensate for deformation occurring during pressure rolling;

(b) heating the one or more cladding strips and the core to a solid-phase bonding temperature; and (c) passing the core and the one or more cladding strips together through pressure rollers with the application of a pressure for solid-phase bonding the one or more cladding strips against the core to form the circular rod clad product, wherein the bonding pressure deforms the cladding strip transverse crowns to compensate for dimensional distortion occurring from non-uniform material flow in the one or more cladding strips during solid-phase bonding for obtaining uniform concentricity of the circular rod clad product and uniform thickness of the cladding.

4. The method of claim 3, wherein step (a) further comprises preforming the core in circular cross-section, and wherein step (c) comprises passing the core and the one or more cladding strips together through pressure rollers for solid-phase bonding the one or more strips against the core, the bonding pressure deforming the cladding strip transverse crowns for obtaining a rod clad product of closely-toleranced concentricity with an integral outer cladding sheath of uniform thickness around the circular core.

5. The method of claim 4, wherein step (a) comprises preforming a plurality of cladding strips, each strip having a transversely crowned surface.

6. The method of claim 5, wherein step (a) comprises preforming the plurality of cladding strips, each strip having an uncrowned flat surface opposite to the crowned surface for pressing engagement against the core in step (c).

7. The method of claim 5, wherein step (a) comprises preforming the plurality of cladding strips, each strip having a concave surface opposite to the crowned surface contoured to the outer surface of the core for pressing engagement against the core in step (c).

8. The method of claim 4, wherein step (a) comprises preforming a pair of cladding strips, each strip having a transversely crowned surface, and wherein step (c) comprises positioning the core between the pair of cladding strips with the transversely crowned surfaces facing away from the core and passing the core and strips together through a pair of opposed rotating pressure rollers for solid-phase bonding the two strips against the core, the bonding pressure of the two rollers deforming the crowned strips to circular form for obtaining a rod clad product of closely-toleranced concentricity with an integral outer cladding sheath of uniform thickness around the circular core.

9. The method of claim 4, wherein step (a) comprises preforming three cladding strips, each strip having a transversely crowned surface, and wherein step (c) comprises positioning the core between the three cladding strips with the transversely crowned surfaces facing away from the core and passing the core rod and strips together through three equally-spaced rotating pressure rollers for solid-phase bonding the three strips against the core, the bonding pressure of the three rollers deforming the crowned strips to circular form for obtaining a rod clad product of closely-toleranced concentricity with an integral outer cladding sheath of uniform thickness around the circular core.

10. The method of claim 4, wherein step (a) comprises preforming four cladding strips, each strip having a transversely crowned surface, and wherein step (c) comprises positioning the core between the four cladding strips with the transversely crowned surfaces facing away from the core and passing the core and strips together through four equally-spaced rotating pressure rollers for solid-phase bonding the four strips against the core, the bonding pressure of the four rollers deforming the crowned strips to circular form for obtaining a rod clad product of closely-toleranced concentricity with an integral outer cladding sheath of uniform thickness around the circular core.

11. The method of claim 4, wherein step (a) comprises preforming a plurality of transverse crowns on a surface of one cladding strip, the strip having a concave surface opposite to the crowned surface and being contoured to the outer surface of the core for pressing engagement against the core in step (c).

12. The method of claim 4, wherein step (a) comprises preforming the circular core and the plurality of transverse crowns on one or more strips, the crown thickness corresponding to the amount of deformation caused by the bonding pressure during the solid-phase bonding of step (c) to obtain a uniform thickness of the outer cladding sheath around the core and the closely-toleranced concentricity of the circular rod clad product.

13. The method of claim 3, wherein the core is comprised of a metal and the cladding is comprised of a dissimilar metal, and wherein step (b) comprises induction heating or laser heating the cladding and the core.

14. A method of manufacturing a solid-phase bonded rod clad product of circular cross section and uniform concentricity having a core member and cladding thereon comprised of a material dissimilar from that of the core member, comprising the steps of:

(a) preforming the core member with a transverse oval-shaped cross section to compensate for deformation occurring during pressure rolling;

(b) heating the cladding and the core to a solid-phase-bonding temperature; and (c) passing the core and the cladding together through pressure rollers with application of a pressure for solid-phase bonding the cladding against the core to form the circular rod clad product, wherein the bonding pressure deforms the oval-shaped core to compensate for dimensional distortion occurring from non-uniform material flow in the core during solid-phase bonding for obtaining the uniform concentricity of the circular rod clad product.

15. The method of claim 14, wherein the cladding comprises one or more cladding strips of substantially flat cross section, and wherein step (c) comprises passing the oval core and the one or more cladding strips together through pressure rollers for solid-phase bonding the one or more strips against the core, the bonding pressure deforming the oval core to circular form for obtaining a rod clad product of closely-toleranced concentricity with an integral outer cladding sheath of uniform thickness around the circular core.

16. The method of claim 13, wherein step (a) comprises preforming the core with a transverse oval cross section, the difference in the minimum and maximum cross section diameters of the core corresponding to the amount of deformation caused by the bonding pressure during the solid-phase bonding of step (c) to form the circularity of the core and for obtaining a rod clad product of closely-toleranced concentricity with an integral outer cladding sheath of uniform thickness around the circular core.

17. The method of claim 2, wherein step (a) further comprises, preforming the cladding with a plurality of transverse crowns on one or more cladding strips.

18. The method of claims 11 or 14, wherein step (a) comprises preforming at least the core or the cladding of a metal.

19. The method of claims 11 or 14, wherein the core is comprised of a metal and the cladding is comprised of a dissimilar metal.

20. The method of claim 19, wherein step (b) comprises resistance-heating at least the cladding metal.

21. The method of claim 19, wherein step (b) comprises induction-heating the cladding metal on the core metal.

22. The method of claims 11 or 14, wherein step (b) comprises laser-heating the cladding and the core.

* * * * *